US012181037B2

(12) United States Patent
Katayama et al.

(10) Patent No.: US 12,181,037 B2
(45) Date of Patent: Dec. 31, 2024

(54) ROTARY DRIVING DEVICE

(71) Applicants: TOYOTA JIDOSHA KABUSHIKI KAISHA, Toyota (JP); AISIN CORPORATION, Kariya (JP)

(72) Inventors: Yuki Katayama, Toyota (JP); Kazuyuki Sakaguchi, Kariya (JP); Hiroshi Ieiri, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 448 days.

(21) Appl. No.: 17/646,728

(22) Filed: Jan. 3, 2022

(65) Prior Publication Data
US 2022/0221044 A1 Jul. 14, 2022

(30) Foreign Application Priority Data

Jan. 13, 2021 (JP) ................................. 2021-003308

(51) Int. Cl.
*F16H 57/04* (2010.01)
*F16H 57/00* (2012.01)
*F16H 57/021* (2012.01)

(52) U.S. Cl.
CPC ....... *F16H 57/043* (2013.01); *F16H 57/0018* (2013.01); *F16H 57/021* (2013.01); *F16H 57/0441* (2013.01)

(58) Field of Classification Search
CPC .. F16H 57/043; F16H 57/0018; F16H 57/021; F16H 57/0441

USPC ....................................... 464/7, 16; 384/465
See application file for complete search history.

(56) References Cited

U.S. PATENT DOCUMENTS

| | | | |
|---|---|---|---|
| 3,051,533 A * | 8/1962 | Brass | F16N 7/18 384/465 |
| 4,140,441 A * | 2/1979 | Patterson | F04D 29/063 |
| 4,951,467 A * | 8/1990 | Walsh | F16H 41/30 |
| 2004/0172936 A1* | 9/2004 | Mueller | F16D 33/00 |
| 2007/0140606 A1 | 6/2007 | Feng et al. | |
| 2011/0179897 A1 | 7/2011 | Kirchner et al. | |
| 2018/0363762 A1 | 12/2018 | Kiyokami et al. | |

FOREIGN PATENT DOCUMENTS

| | | |
|---|---|---|
| JP | 2007-170506 A | 7/2007 |
| JP | 2019-7499 A | 1/2019 |
| JP | 2020-31492 A | 2/2020 |

* cited by examiner

*Primary Examiner* — Greg Binda
(74) *Attorney, Agent, or Firm* — Oblon, McClelland, Maier & Neustadt, L.L.P.

(57) ABSTRACT

The rotary driving device includes a shaft which has one end and the other end in the axial direction and is provided with an oil passage through which lubricating oil flows from one end to the other end, a transmission case accommodating the shaft therein, and a bearing arranged at the other end of the shaft in the transmission case and rotatably supporting the shaft. The shaft includes an end surface located on the other end in the axial direction. The transmission case includes an opposing surface facing the end surface with a gap therebetween in the axial direction. One of the end surface and the opposing surface is provided with a groove so as to generate a negative pressure on the other end when the shaft rotates.

5 Claims, 6 Drawing Sheets

ROTARY DRIVING DEVICE

This non-provisional application is based on Japanese Patent Application No. 2021-003308 filed on Jan. 13, 2021 with the Japan Patent Office, the entire contents of which are hereby incorporated by reference.

BACKGROUND

Field

The present disclosure relates to a rotary driving device mounted on a transmission.

Description of the Background Art

Japanese Patent Laying-Open No. 2020-031492 discloses a conventional rotary driving device in which a driving shaft is provided with an oil passage through which lubricating oil flows, and the driving shaft is rotatably supported in a transmission by a bearing.

SUMMARY

The driving shaft described in Japanese Patent Laying-Open No. 2020-031492 is provided with an oil passage through with lubricating oil flows from one end to the other end in the axial direction. Generally, the driving shaft is supported by a bearing arranged at one end and a bearing arranged at the other end. In such a configuration that the lubricating oil flows from one end to the other end of the driving shaft, after the lubricating oil passes through the oil passage inside the driving shaft, the lubricating oil is supplied to the bearing arranged at the other end of the driving shaft. Therefore, it takes time to supply the lubricating oil to the bearing, and the bearing may not be sufficiently lubricated immediately after the start of operation.

The present disclosure has been made in view of the aforementioned problems, and an object of the present disclosure is to provide a rotary driving device that allows lubricating oil to flow efficiently inside a shaft from one end to the other end thereof so as to shorten a time required for the lubricating oil to reach a bearing that supports the other end of the shaft.

A rotary driving device according to the present disclosure includes a shaft which has one end and the other end in an axial direction and is provided with an oil passage through which lubricating oil flows from the one end to the other end, a transmission case accommodating the shaft therein, and a bearing arranged at the other end of the shaft in the transmission case and rotatably supporting the shaft. The shaft includes an end surface located on the other end in the axial direction. The transmission case includes an opposing surface facing the end surface with a gap therebetween in the axial direction. One of the end surface and the opposing surface is provided with a groove so as to generate a negative pressure on the other end when the shaft rotates.

According to the configuration mentioned above, since the groove is provided on the end surface located on the other end of the shaft or on the opposing surface facing the end surface with a gap therebetween, when the shaft rotates, the air is discharged through the groove to the periphery of the other end, and thereby a negative pressure is generated on the other end of the shaft. Thus, the lubricating oil supplied to one end of the shaft is sucked toward the other end of the shaft, which makes it possible for the lubricating oil to flow efficiently inside the shaft. As a result, it is possible to shorten the time required for the lubricating oil to reach the bearing arranged at the other end of the shaft while preventing the lubricating oil from leaking to the outside from one end of the shaft.

In the rotary driving device according to the present disclosure, the transmission case includes an opposing wall facing the other end of the shaft in the axial direction. In this case, an inner surface of the opposed wall may be provided with an annular member which is coaxial with a central axis of the shaft, and the opposing surface may be formed by an end surface of the annular member facing the end surface of the shaft in the axial direction.

According to the configuration mentioned above, by providing the transmission case with the annular member facing the end surface with a gap from the end surface of the shaft in the axial direction, it is possible to efficiently flow the lubricating oil inside the shaft from one end to the other end thereof with a simple structure, which makes it possible to shorten the time required for the lubricating oil to reach the bearing that supports the other end of the shaft.

In the rotary driving device according to the present disclosure, the groove may be provided as a plurality of grooves. In this case, the plurality of grooves may be provided around the central axis of the shaft in a radial pattern.

According to the configuration mentioned above, the air in the shaft may be more effectively discharged to the outside of the shaft from the other end.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
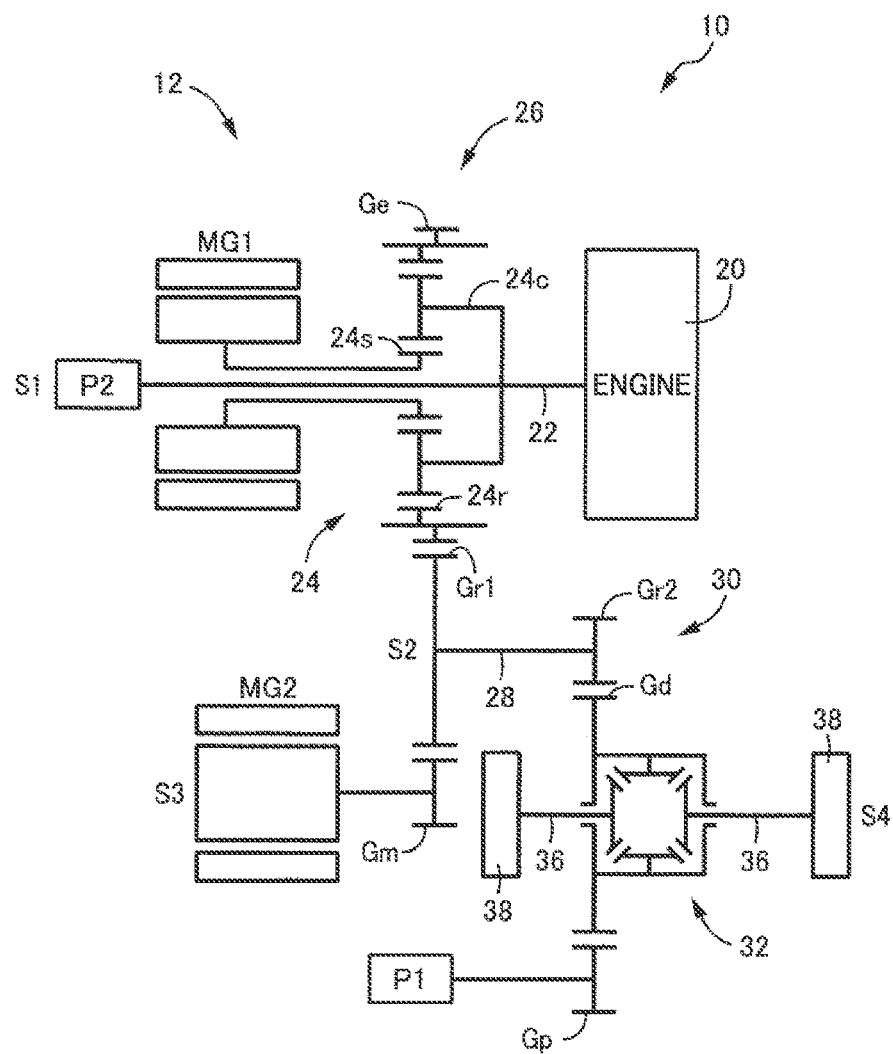
FIG. 1 is a view illustrating a configuration of a power transmission device according to an embodiment.

Hereinafter, an embodiment of the present disclosure will be described in detail with reference to the drawings. In the following embodiment, the same or equivalent portions in the drawings will be denoted by the same reference numerals, and the description thereof will not be repeated.

FIG. 1 is a view illustrating a configuration of a power transmission device 12 according to an embodiment. The power transmission device 12 according to the present embodiment will be described with reference to FIG. 1.

As illustrated in FIG. 1, the power transmission device 12 is mounted on a vehicle 10. The vehicle 10 may be an engine-driven vehicle or a hybrid electric vehicle (HEV) provided with a rotary driving machine, i.e., a driving motor, in addition to an engine as a power source. The vehicle 10 may be a battery electric vehicle (BEV) provided with only an electric motor as the power source.

The power transmission device 12 is preferably a horizontal transaxle such as an FF (front engine front drive) power transmission device in which a plurality of shafts are arranged in the width direction of the vehicle 10, but it may be an FR power transmission device or a four-wheel drive power transmission device. The output unit of the power transmission device 12 is, for example, a differential device that outputs a driving force transmitted from the power source via a gear mechanism or the like to a pair of left and right driving wheels.

Specifically, the power transmission device 12 includes a first shaft S1, a second shaft S2, a third shaft S3, and a fourth shaft S4 which are arranged substantially parallel to the width direction of the vehicle 10. An input shaft 22 is disposed on the first shaft S1 and the input shaft 22 is coupled to an engine 20 which serves as the power source. A single pinion type planetary gear train 24 and a first electric motor MG1 are arranged concentrically with the first shaft S1.

The planetary gear train 24 and the first electric motor MG1 function as an electric differential unit 26. The input shaft 22 is coupled to a carrier 24c of the planetary gear train 24 serving as a differential mechanism, and the first electric motor MG1 is coupled to a sun gear 24s. A ring gear 24r is provided with an output gear Ge.

The first electric motor MG1 corresponds to a differentially controlled rotary machine. The first electric motor MG1 may function as an electric motor or a generator alternatively. Under a regenerative control, the first electric motor MG1 functions as a generator, the rotational speed of the sun gear 24s is continuously changed, whereby the rotational speed of the engine 20 is continuously changed and output from the output gear Ge. When the torque of the first electric motor MG1 becomes 0, the sun gear 24s becomes idle, which prevents the engine 20 from rotating. The engine 20 is an internal combustion engine that generates power by combusting fuels.

A reduction gear unit 30 is disposed on the second shaft S2. The reduction gear unit 30 includes a large reduction gear Gr1 and a small reduction gear Gr2 provided at both ends of a shaft 28. The large reduction gear Gr1 is meshed with the output gear Ge. The large reduction gear Gr1 is meshed with an output gear Gm of a second electric motor MG2 disposed on the third shaft S3.

The second electric motor MG2 may function as an electric motor or a generator alternatively. Under a power-running control, the second electric motor MG2 functions as an electric motor, and thereby it is used as a power source for the hybrid electric vehicle. The second electric motor MG2 corresponds to a driving motor.

The small reduction gear Gr2 is meshed with a differential ring gear Gd of a differential device 32 disposed on the fourth shaft S4. The driving force from the engine 20 and the second electric motor MG2 is distributed to a pair of left and right driving shafts 36 via the differential device 32, and transmitted to a pair of left and right driving wheels 38. The differential device 32 corresponds to an output unit, and the differential ring gear Gd corresponds to an input gear.

The planetary gear train 24, the output gear Ge, the large reduction gear Gr1, the small reduction gear Gr2, the differential ring gear Gd and the like constitute a gear mechanism.

Figure 2:
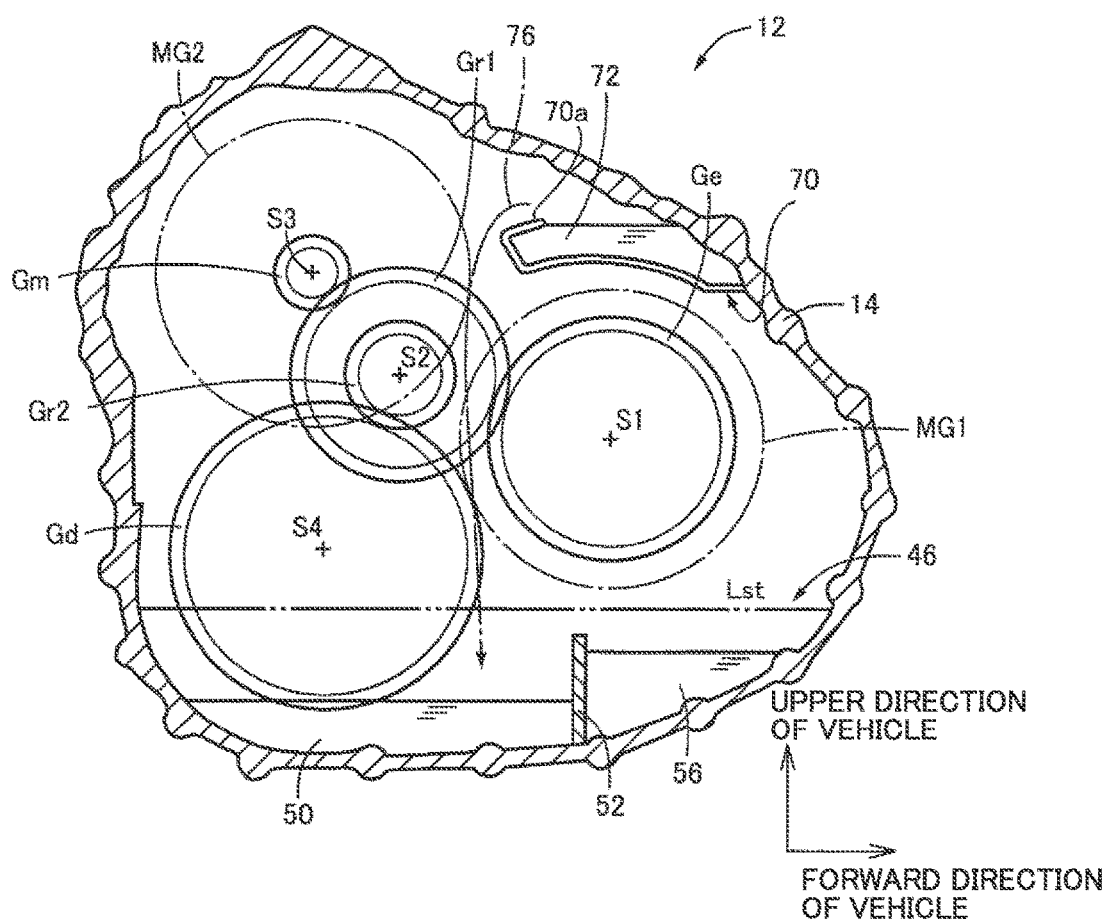
FIG. 2 is a cross-sectional view illustrating a positional relationship between a plurality of shafts provided in the power transmission device of FIG. 1.

FIG. 2 is a cross-sectional view illustrating a positional relationship between a plurality of shafts provided in the power transmission device of FIG. 1.

As illustrated in FIG. 2, the fourth shaft S4 is arranged at the lowest position among the first shaft S1 to the fourth shaft S4, the second shaft S2 and the third shaft S3 are arranged at a position above the fourth shaft S4, and the first shaft S1 is arranged at a position diagonally above the fourth shaft S4 in the forward direction of the vehicle 10.

An oil catch tank 70 is provided inside a case 14 at an upper position. An upper surface of the oil catch tank 70 is formed with an opening. For example, the lubricating oil sucked up due to the rotation of the differential ring gear Gd flows into the oil catch tank 70 through the opening and is accumulated in the oil catch tank 70. The oil catch tank 70 corresponds to a third oil reservoir 72.

The oil catch tank 70 is arranged above the first electric motor MG1. The oil catch tank 70 may be arranged above the second electric motor MG2.

The vehicle 10 may travel in a BEV (Battery Electric Vehicle) travel mode and an HEV (Hybrid Electric vehicle) travel mode.

Specifically, in the BEV travel mode, the engine 20 is stopped, and the second electric motor MG2 is used as the power source under the power running control. The BEV travel mode is selected when a low driving force is required, in other words, in a low load range.

In the HEV travel mode, the engine 20 is used as the power source while the first electric motor MG1 generates a reaction force under the regenerative control. The HEV travel mode is selected when a driving force higher than that in the BEV travel mode is required, in other words, in a high load range. Instead of or in addition to the HEV travel mode, an engine travel mode in which only the engine 20 is used as the power source may be provided.

Figure 3:
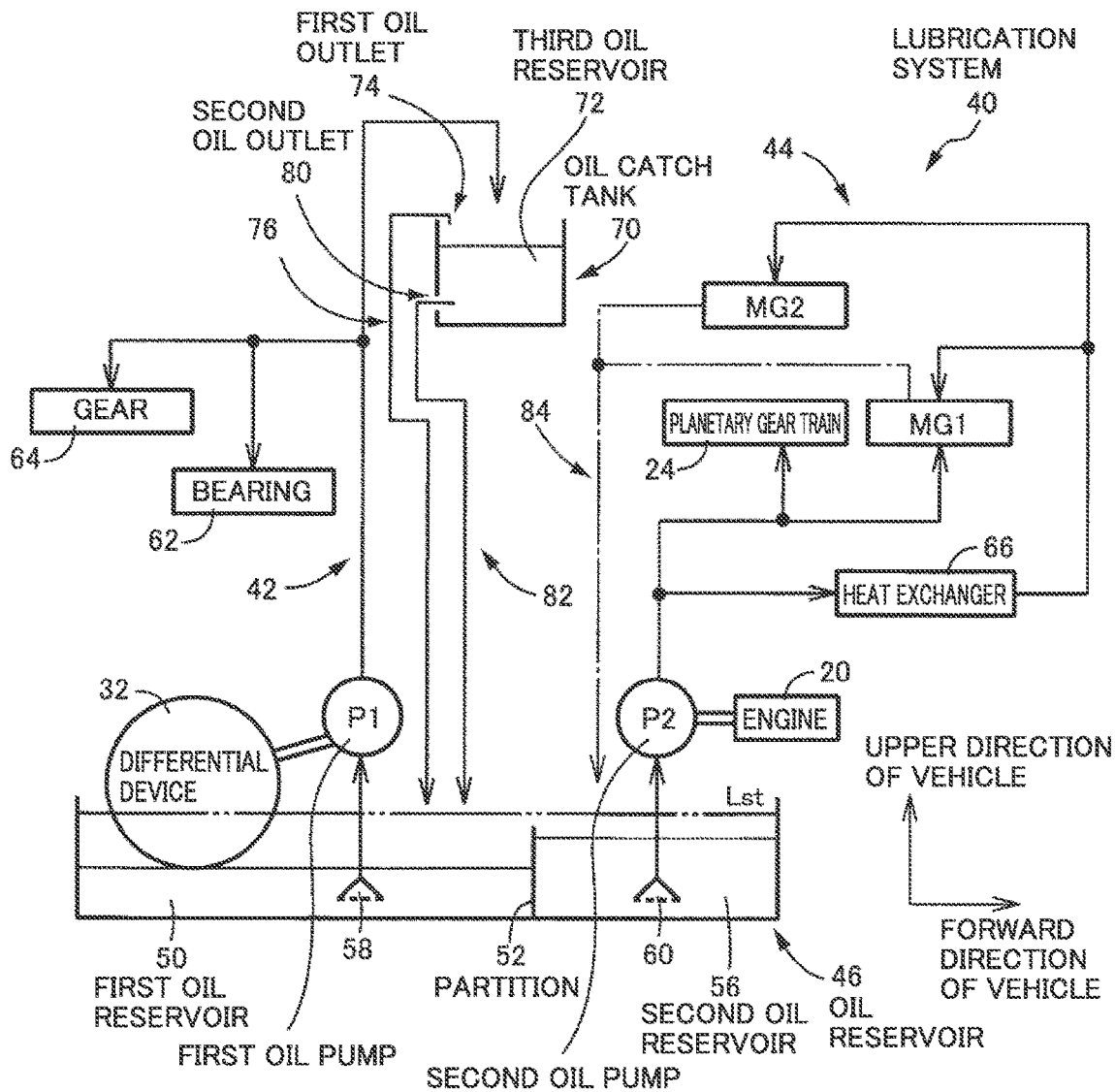
FIG. 3 is a view illustrating a lubrication system provided in the power transmission device according to the present embodiment.

FIG. 3 is a view illustrating a lubrication system 40 provided in the power transmission device according to the present embodiment. As illustrated in FIG. 3, the lubrication system 40 is provided with a suction device including a first oil pump P1 and a second oil pump P2. The first oil pump P1 is connected to a first oil supply passage 42 and the second oil pump P2 is connected to a second oil supply passage 44 so as to supply the lubricating oil to each component of the power transmission device 12. The first oil supply passage 42 and the second oil supply passage 44 are independent of each other.

As illustrated in FIG. 1, the first oil pump P1 is mechanically driven by the output unit (the differential device 32) via a pump driving gear Gp meshed with the differential ring gear Gd. The second oil pump P2 is coupled to the input shaft 22, and is mechanically driven by the engine 20.

The first oil pump P1 may be driven by the pump driving gear Gp meshed with the large reduction gear Gr1, the small reduction gear Gr2, or the like interlocked with the differential ring gear Gd.

The first oil pump P1 and the second oil pump P2 suck the lubricating oil from an oil reservoir 46 arranged at the bottom of the case 14, and supply the lubricating oil to the first oil supply passage 42 and the second oil supply passage 44, respectively. The oil reservoir 46 is constituted by the case 14 itself. The oil reservoir 46 is partitioned into a rear portion and a front portion in the front-rear direction of the vehicle 10 by a partition wall 52. The rear portion is defined as a first oil reservoir 50, and the front portion is defined as a second oil reservoir 56.

The first oil reservoir 50 is arranged below the differential device 32. The second oil reservoir 56 is arranged below the first shaft S1 on which the planetary gear train 24 and the like are disposed. A suction port 58 of the first oil pump P1 is arranged in the first oil reservoir 50. A suction port 60 of the second oil pump P2 is arranged in the second oil reservoir 56. The suction port 58 and the suction port 60 are connected to the first oil pump P1 and the second oil pump P2 via separate oil suction passages, respectively.

The first oil supply passage 42 is connected to a discharge port of the first oil pump P1 so as to supply the lubricating oil to each component of the power transmission device 12. Specifically, the first oil supply passage 42 is configured to supply the lubricating oil to the bearing 62, the gear mechanism 64 (such as Ge, Gr1, Gr2, Gd, Gm, Gp) and the like of each component of the power transmission device 12, and supply the lubricating oil to the third oil reservoir 72.

The second oil supply passage 44 is connected to a discharge port of the second oil pump P2 so as to supply the lubricating oil to the input shaft 22, the planetary gear train 24, and the first electric motor MG1 located above the second oil reservoir 56 to cool the input shaft 22, the planetary gear train 24, and the first electric motor MG1. A heat exchanger 66 is provided in the second oil supply passage 44, and is configured to cool the lubricating oil and supply the cooled lubricating oil to the first electric motor MG1 and the second electric motor MG2 so as to cool the first electric motor MG1 and the second electric motor MG2. The heat exchanger 66 may be an oil cooler that cools the lubricating oil by heat exchange via air cooling or water cooling.

The third oil reservoir 72 is arranged at a position higher than a stationary oil level Lst. The third oil reservoir 72 is arranged at a position higher than the first oil reservoir 50 and the second oil reservoir 56.

The third oil reservoir 72 has a first oil outlet 74. When the lubricating oil stored in the third oil reservoir 72 exceeds a predetermined oil level, the lubricating oil flows into the first oil reservoir 50 through the first oil outlet 74 by gravity.

The third oil reservoir 72 has a second oil outlet 80 disposed at a position lower than the first oil outlet 74. Even when the lubricant oil stored in the third oil reservoir 72 is equal to or less than the predetermined oil level, in other words, even when the lubricant oil does not exceed the predetermined oil level, the lubricant oil may continuously flow into the first oil reservoir 50 through the second oil outlet 80 by gravity without passing through the second oil reservoir 56.

Figure 4:
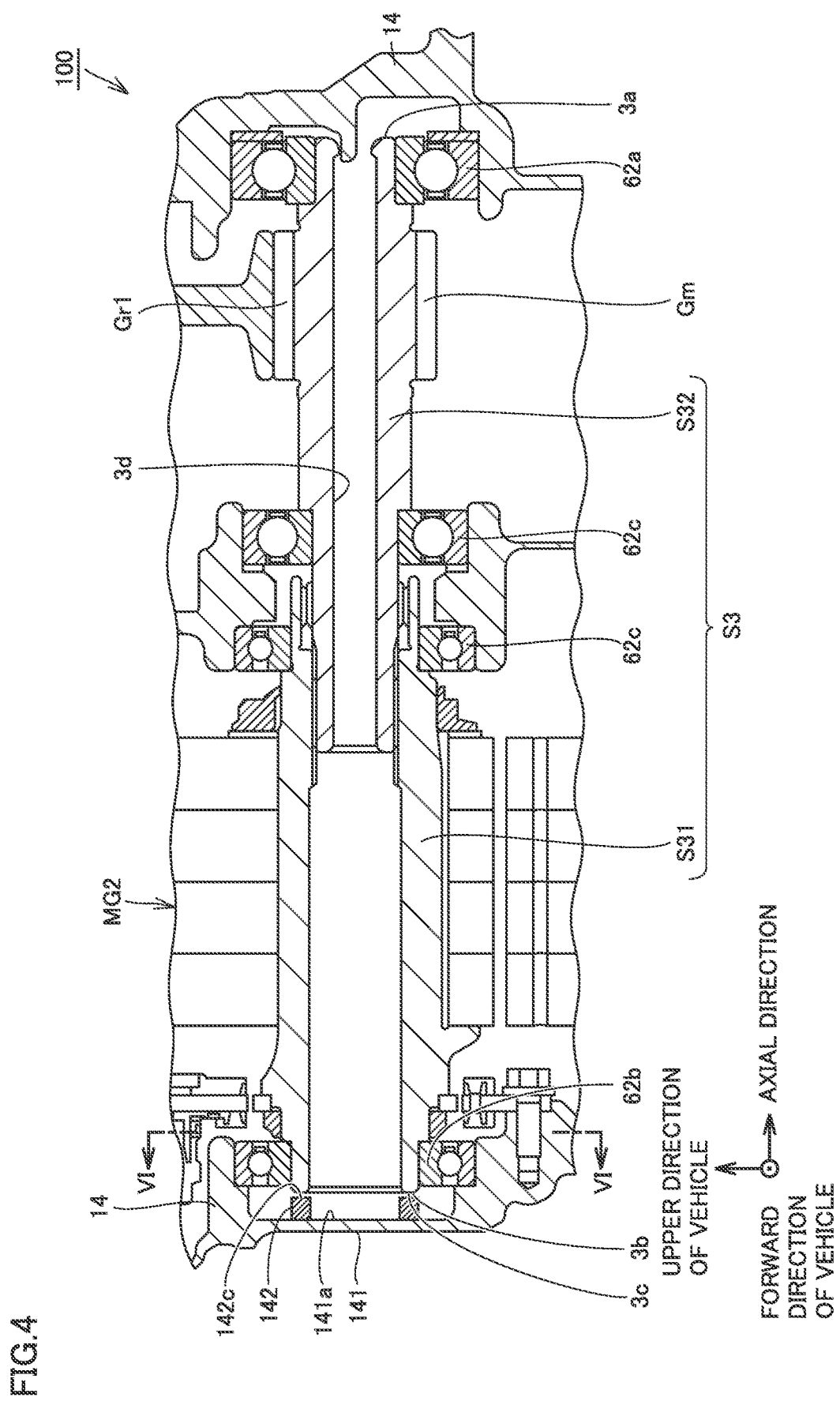
FIG. 4 is a schematic cross-sectional view illustrating a rotary driving device provided in the power transmission device according to the present embodiment.

FIG. 4 is a schematic cross-sectional view illustrating a rotary driving device 100 provided in the power transmission device according to the present embodiment.

As illustrated in FIG. 4, the rotary driving device 100 according to the present embodiment includes a case 14 as a transmission case, a third shaft S3 coupled to the second electric motor MG2, and bearings 62*a*, 62*b* and 62*c*.

The third shaft S3 has one end 3*a* and the other end 3*b* in the axial direction. The third shaft S3 is provided with an oil passage 3*d* through which the lubricating oil flows from one end 3*a* to the other end 3*b*. The third shaft S3 has an end surface 3*c* located on the other end 3*b* in the axial direction.

The third shaft S3 includes a rotor shaft S31 to which a rotor of the second electric motor MG2 is fixed, and a coupling shaft S32 concentrically coupled to the rotor shaft S31 by spline fitting. In the fitting portion with the rotor shaft S31, the outer diameter of the coupling shaft S32 is smaller than the inner diameter of the rotor shaft S31.

The rotor shaft S31 is arranged at the side of the other end 3*b* of the third shaft S3. The coupling shaft S32 is arranged at the side of one end 3*a* of the third shaft S3. The motor output gear Gm is coupled to the coupling shaft S32.

The third shaft S3 is rotatably supported in the case 14 by bearings 62*a*, 62*b* and 62*c*.

The bearing 62*a* is arranged at one end 3*a* of the third shaft S3. The bearing 62*b* is arranged at the other end 3*b* of the third shaft S3. The bearing 62*c* is arranged substantially at the center of the third shaft S3.

The case 14 accommodates therein the third shaft S3 and the bearings 62*a*, 62*b* and 62*c*. The case 14 supports the bearings 62*a*, 62*b* and 62*c*.

The case 14 has an opposing wall 141 facing the end surface 3*c* of the third shaft S3 in the axial direction of the third shaft S3. An inner surface 141*a* of the opposing wall 141 is provided with an annular member 142.

The annular member 142 is coaxial with the central axis of the third shaft S3. The central axis of the annular member 142 and the central axis of the third shaft S3 are coaxial with each other. The annular member 142 has an end surface 142*c* facing the end surface 3*c* of the third shaft S3 in the axial direction. The end surface 142*c* corresponds to an opposing surface of the case 14 facing the end surface 3*c* with a gap therebetween in the axial direction. The gap enables the rotation of the third shaft S3 to produce a pumping effect.

In the present embodiment, it is described that the annular member 142 is a separate member from the case 14, but the present disclosure is not limited thereto, the annular member 142 may be a part of the case 14 or may be integrated with the case 14.

Figure 5:
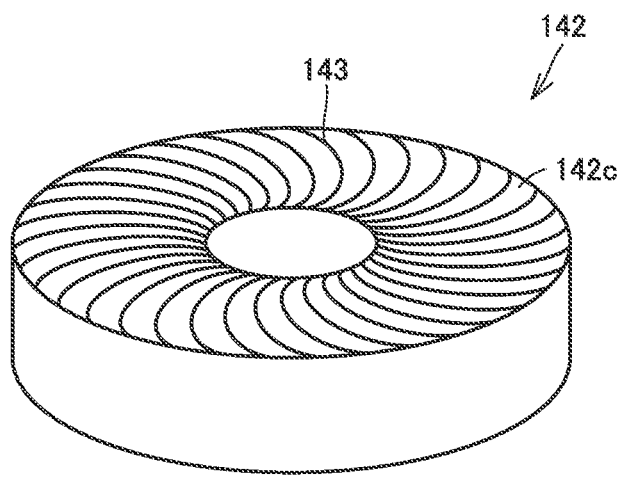
FIG. 5 is a perspective view illustrating an annular member provided on a transmission case of the power transmission device according to the present embodiment.

FIG. 5 is a perspective view illustrating the annular member provided on the transmission case of the power transmission device according to the present embodiment.

As illustrated in FIG. 5, the end surface 142*c* of the annular member 142 is provided with a plurality of grooves 143. The plurality of grooves 143 enable the rotation of the third shaft S3 to produce a pumping effect so as to generate a negative pressure on the other end 3*b* of the third shaft S3. The number of grooves 143 may be one as long as a negative pressure may be generated.

The plurality of grooves 143 are provided around the central axis of the third shaft S3 in a radial pattern. Thus, as will be described later, when the third shaft S3 rotates, the air inside the third shaft S3 may be more effectively discharged from the other end 3*b* to the outside of the third shaft S3.

Each groove 143 is provided so as to extend from an inner peripheral edge of the end surface 142*c* to an outer peripheral edge thereof. Each groove 143 may start from the inner peripheral edge of the end surface 142*c* or may start from a position away from the inner peripheral edge. Similarly, each groove 143 may end at the outer peripheral edge of the end surface 142*c* or may end at a position inwardly away from the outer peripheral edge. Each groove 143 may be curved or bend toward the outer peripheral edge.

Figure 6:
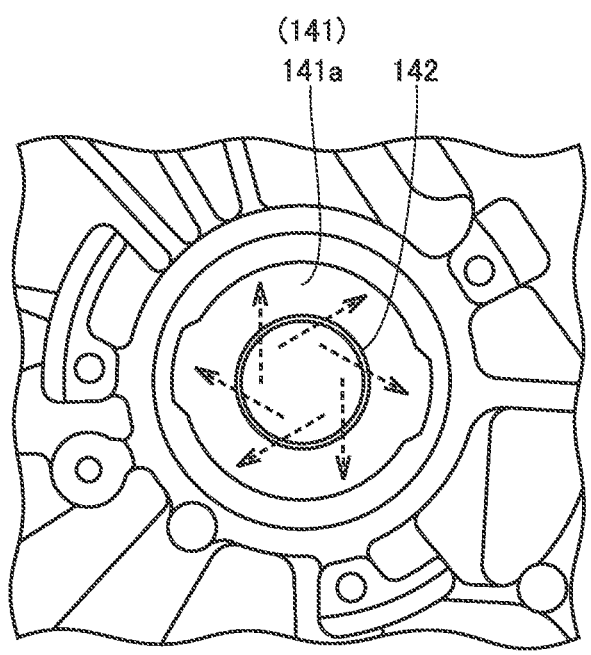
FIG. 6 is a view illustrating the flow of air on the other end of the shaft in the rotary driving device according to the present embodiment.

FIG. 6 is a view illustrating the flow of air on the other end of the shaft in the rotary driving device according to the present embodiment. FIG. 6 is a plan view of the annular member 142 and its periphery as viewed in the direction indicated by an arrow VI in FIG. 4.

As illustrated by the broken arrows in FIG. 6, when the third shaft S3 rotates, the air is discharged through the plurality of grooves 143 to the outside of the third shaft S3 in the radial direction from the gap between the end surface 142c of the annular member 142 and the end surface 3c of the third shaft S3. Accordingly, a negative pressure is generated on the other end 3b of the third shaft S3. Thus, the pressure on the other end 3b of the third shaft S3 becomes lower than the pressure on the one end 3a of the third shaft S3.

Figure 7:
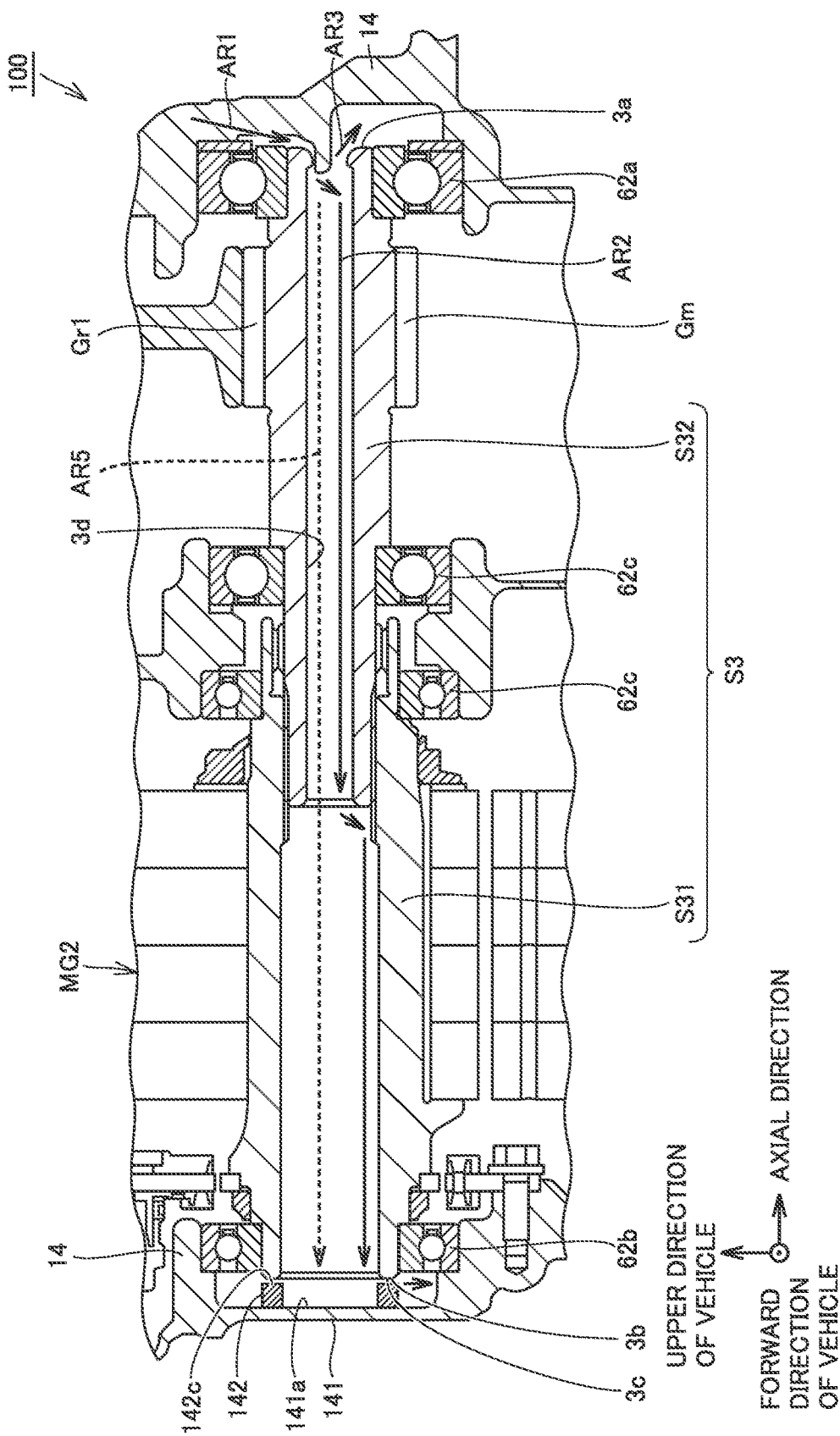
FIG. 7 is a schematic cross-sectional view illustrating how air and lubricating oil flow in the rotary driving device according to the present embodiment.

FIG. 7 is a schematic cross-sectional view illustrating how air and lubricating oil flow in the rotary driving device according to the present embodiment.

When the vehicle 10 is started travelling, the lubricating oil supplied from the first supply passage 42 is introduced into the oil passage 3d from one end 3a of the third shaft S3 as indicated by an arrow AR1 in FIG. 7.

Generally, a part of the lubricating oil introduced into the oil passage 3d leaks from one end 3a to the outside of the third shaft S3 as indicated by an arrow AR3, and the rest thereof flows toward the other end 3b as indicated by an arrow AR2.

In the present embodiment, as described above, since the plurality of grooves 143 are provided on the opposing surface, i.e., the end surface 142c, when the third shaft S3 rotates, a negative pressure is generated on the other end 3b of the third shaft S3. Therefore, as indicated by an arrow AR5, the air inside the third shaft S3 is sucked toward the other end 3b.

Thus, the lubricating oil supplied to the one end 3a of the third shaft S3 is sucked toward the other end 3b of the third shaft S3, which makes it possible to flow efficiently the lubricating oil in the third shaft S3. As a result, it is possible to shorten the time required for the lubricating oil to reach the bearing 62b arranged at the other end 3b of the third shaft S3 while preventing the lubricating oil from leaking to the outside from one end 3a of the third shaft S3.

(Modifications)

Although in the embodiment mentioned above, it is described that the plurality of grooves 143 are provided on the end surface 142c of the annular member 142, but the present disclosure is not limited thereto, and the plurality of grooves 143 may be provided on the end surface 3c of the third shaft S3.

Further, in the embodiment mentioned above, it is described that the annular member 142 is provided, but the present disclosure is not limited thereto, and the annular member 142 may be not provided. In this case, the opposing wall 141 may become thicker, and the inner surface 141a may directly face the end surface 3c of the third shaft S3 with a gap capable of generating a pumping effect. However, when the annular member 142 is provided, it is possible to efficiently flow the lubricating oil inside the third shaft S3 with a simple structure without changing the shape of the case 14, which makes it possible to shorten the time required for the lubricating oil to reach the bearing that supports the other end 3b of the third shaft S3.

In addition, in the embodiment mentioned above, it is described that the rotary driving device 100 is applied to the third shaft S3 of the second electric motor MG2, but the present disclosure is not limited thereto, and the rotary driving device 100 may be applied to the first shaft S1 of the first electric motor MG1 or the second shaft S2 of the reduction gear unit 30.

Although the embodiments of the present disclosure have been described as above, it should be understood that the embodiments disclosed herein are illustrative and non-restrictive in every respect. The scope of the present disclosure is defined by the terms of the claims, and is intended to include any modifications within the meaning and scope equivalent to the terms of the claims.

What is claimed is:

1. A rotary driving device comprising:
    a shaft which has one end and the other end in an axial direction and is provided with an oil passage through which lubricating oil flows from the one end to the other end;
    a transmission case accommodating the shaft therein; and
    a bearing arranged at the other end of the shaft and rotatably supporting the shaft,
    the shaft including an end surface located on the other end in the axial direction,
    the transmission case including an opposing surface facing the end surface with a gap therebetween in the axial direction, and
    one of the end surface and the opposing surface being provided with a groove so as to generate a negative pressure on the other end when the shaft rotates to suck the lubricating oil through the oil passage towards the other end.

2. The rotary driving device according to claim 1, wherein the transmission case includes an opposing wall facing the other end of the shaft in the axial direction,
    an inner surface of the opposed wall is provided with an annular member which is coaxial with a central axis of the shaft, and
    the opposing surface is formed by a surface of the annular member facing the end surface of the shaft in the axial direction.

3. The rotary driving device according to claim 1, wherein the groove is provided as a plurality of grooves, and
    the plurality of grooves are provided around a central axis of the shaft in a radial pattern.

4. The rotary driving device according to claim 1, wherein the groove is curved toward an outer peripheral edge of the opposing surface.

5. The rotary driving device according to claim 1, wherein the opposing surface is an annular member which is coaxial with a central axis of the shaft, and
    the gap formed between the end surface of the shaft and the annular member in the axial direction along the central axis.

* * * * *